Jan. 31, 1933. R. P. LANSING 1,895,837
ELECTRICAL APPARATUS
Original Filed March 13, 1928
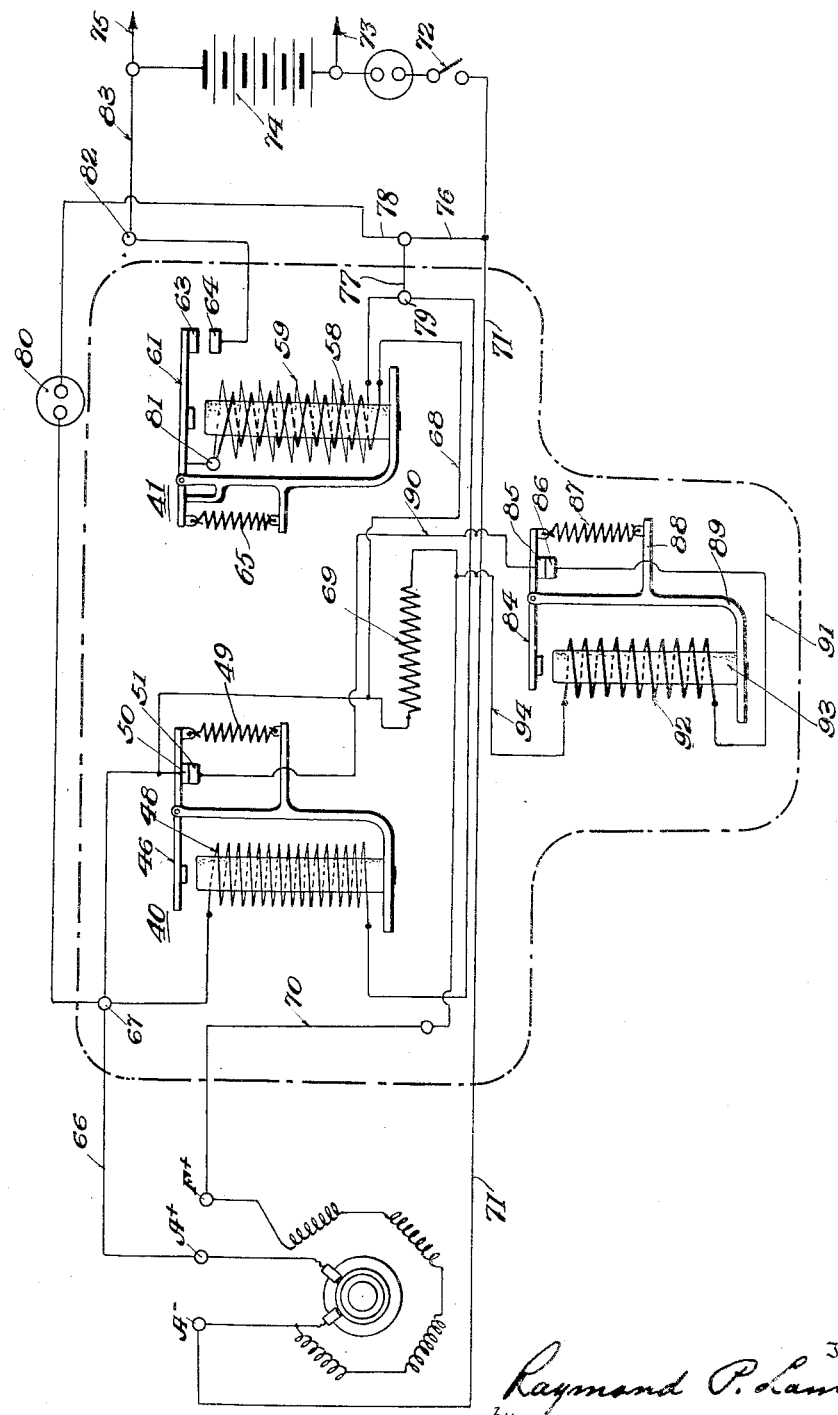
Inventor
Raymond P. Lansing
by
Cameron, Kerkam & Sutton
Attorneys Patented Jan. 31, 1933

1,895,837

UNITED STATES PATENT OFFICE

RAYMOND P. LANSING, OF MONTCLAIR, NEW JERSEY, ASSIGNOR TO ECLIPSE MACHINE COMPANY, OF ELMIRA HEIGHTS, NEW YORK, A CORPORATION OF NEW YORK

ELECTRICAL APPARATUS

Original application filed March 13, 1928, Serial No. 261,349. Divided and this application filed February 12, 1929. Serial No. 339,334.

This invention relates to electrical apparatus and more particularly to means for controlling the output of an electric generator.

One of the objects of the present invention is to provide improved regulating means for controlling the electrical output of a generator.

Another object is to provide novel regulating means of the vibrating type for controlling the voltage output of a generator. Other objects will appear more fully hereafter in the detailed description setting forth the features of advantage of the present invention.

One embodiment of the invention is illustrated in the accompanying drawing, which is a diagrammatic view of the regulating means and connections to the generator to be controlled.

The wiring connections for the generator and regulating means are shown in the drawing. Preferably, the generator is of the shunt field type having a wave wound armature. The positive terminal of the generator is connected through a lead 66 to a binding post 67, to which is also attached one end of the shunt coil 48 of voltage regulating device 40. Conductor 66 is also in circuit with contacts 50, 51 and with a lead 68 connected to the series coil 58 of the main switch 41. A regulator resistance unit 69 is shunted directly across contacts 50 and 51, and said contacts are in series through lead 70 with the plus side of the generator field winding.

The negative field terminal of the generator is internally connected to the negative generator terminal, which latter is in circuit through lead 71, a manually operable switch 72 and an ammeter 73 to the negative side of a storage battery 74 and a load circuit indicated at 75. In circuit with lead 71 is a conductor 76 which divides into two branches 77 and 78. Branch 77 is connected to a binding post 79 to which is also attached one end of coil 48 and one end of the shunt coil 59.

The other branch 78 leads to a voltmeter 80 and from thence to binding post 67. Series coil 58 and shunt coil 59 are connected as at 81 with the armature 61 which carries the contact 63 that is adapted to engage, but is normally out of engagement with, contact 64 which is connected to a binding post 82. A lead 83 passes from post 82 to the positive side of battery 74 and the load circuit 75.

In operation, switch 72 is closed and the armature of the generator is driven in any suitable manner. When the generator is being brought up to speed there is no connection with the load since contacts 63 and 64 are held open by a spring 65. The voltage gradually rises until the shunt coil 59 of the relay switch 41 overbalances the pull of spring 65 and closes contacts 63 and 64, thus connecting the generator to the load or battery. Under such conditions the brush voltage is applied directly across the field. The regulator contacts 50, 51 are held closed by a predetermined pressure of spring 49 corresponding to a predetermined voltage. When the generator voltage exceeds this amount, contacts 50, 51 are opened and the resistance unit 69 is placed in series with the generator field winding, whereupon the voltage output of the generator drops. The moment the voltage drops below a predetermined amount, the contacts 50, 51 immediately close, thus establishing a vibratory operation of sufficiently high frequency to maintain a constant voltage.

The series coil 58 of the relay switch performs two functions. It coacts with shunt coil 59 to hold contacts 63, 64 more firmly closed than said contacts can be held by the shunt coil alone. If the amount of current delivered to the battery or load circuit 75 decreases, due for example to a decrease in the speed of the generator armature, there is a tendency for current to flow from the battery through the series coil 58, whereby the latter sets up a field which coacts with spring 65 to open contacts 63 and 64. After these last named contacts are opened, the current for the load circuit 75 is provided by battery 74 but the charging of the battery is automatically resumed as soon as the voltage through shunt coil 59 is sufficiently high to again close contacts 63 and 64 against the tension of spring 65.

In the form shown, the current regulator comprises a pivoted armature 84 carrying a contact 85 which is normally maintained in engagement with a contact 86 by means of a spring 87 attached at one end to armature 84 and at its opposite end to an arm 88 that projects from an L-shaped bracket 89 that carries said armature.

The contacts 85 and 86 are in series through a lead 90 with the contacts 50, 51 of the voltage regulator and said contacts are also in series through lead 91 with a coil 92 that is preferably constituted by a few turns of heavy wire wound around a core 93, carried by bracket 89, to form an electromagnet for controlling the armature 84. Coil 92 is in circuit through lead 94 with the conductor 70 which is connected to the plus terminal of the field of the generator.

In the event that the current output of the generator exceeds a predetermined amount, for example 15 amperes, the electromagnet 92, 93 is rendered effective to swing armature 84 about its pivot, against the tension of spring 87, and open the contacts 85, 86, whereupon resistance 69 is thrown into series, through lead 70, with the generator field winding and the current output of the generator drops. At the instant that the current is less than a predetermined amount, spring 87 immediately closes contacts 85 and 86, thus establishing a vibratory operation of sufficiently high frequency to maintain a constant current. Thus, the current and voltage output of the generator is controlled by automatically placing a single resistance unit, resistance element 69, in circuit with the field winding of the generator.

There is thus provided novel means for regulating the output of a generator. The control apparatus is automatic in operation and is effective to maintain the output of the generator substantially constant regardless of the speed at which said generator is driven. The apparatus is extremely simple in construction, compact, and is readily accessible for repair. While the embodiment of the invention illustrated in the drawing has been described with considerable particularity it is to be expressly understood that the invention is not restricted thereto, as the same is capable of receiving a variety of expressions, some of which will now readily suggest themselves to those skilled in the art. Reference will therefore be had to the appended claims for a definition of the limits of the invention.

This application is a division of my copending application, Serial No. 261,349, filed March 13, 1928, as is also my copending application Serial Number 619,329, filed June 25, 1932, and directed to the automatic switch per se.

What is claimed is:

1. In combination with a generator, means for controlling the voltage output of the generator including a pair of contacts and a resistance unit adapted to be placed thereby in circuit with the field winding of the generator, and means including said resistance unit for controlling the current output of the generator, said last named means including a coil and a second pair of contacts in series relation with each other and with the first named pair of contacts.

2. In combination with a generator having a field winding, a voltage regulator in parallel relation with said field winding, and a current regulator in series relation with said field winding, said regulators embodying a common resistance unit.

3. In combination with a generator having a field winding, a voltage regulator in parallel relation with said field winding embodying normally closed contacts, a resistance element adapted to be placed in circuit with said field winding, and a current regulator in series relation with said field winding including a pair of normally closed contacts, said resistance element being placed in circuit with said field winding by the opening of said last named pair of contacts.

4. Apparatus for controlling the voltage and current output of a generator having a field winding comprising a pair of normally closed contacts, means for opening said contacts when the voltage output of the generator exceeds a predetermined amount, resistance means adapted to be placed in circuit with said field winding by the opening of said contacts, a second pair of normally closed contacts in series with said first named contacts, and means for opening said second named contacts to place said resistance means in circuit with said field winding, said last named means being rendered operable when the current through the field winding exceeds a predetermined amount.

5. In apparatus for controlling the output of a generator, an electromagnet embodying a coil of many turns of fine wire, a pair of contacts controlled by said electromagnet, a resistance element operatively connected to the contacts, a second electromagnet embodying a coil of a few turns of heavy wire, a pair of contacts controlled by said second electromagnet and in series with said last named coil, and means connecting said first and second named pairs of contacts in series.

6. In combination with a generator having a field winding, a voltage regulator having a pair of normally closed contacts, a current regulator having a coil and a second pair of normally closed contacts, both pairs of contacts and the coil of the current regulator being in series relation with each other and with the field winding, and a common resistance element adapted to be placed in series relation with the field winding by the opening of either pair of normally closed contacts.

In testimony whereof I have signed this specification.

RAYMOND P. LANSING.